(12) United States Patent
Wang et al.

(10) Patent No.: US 11,363,010 B2
(45) Date of Patent: Jun. 14, 2022

(54) METHOD AND DEVICE FOR MANAGING DIGITAL CERTIFICATE

(71) Applicant: CHINA IWNCOMM CO., LTD., Shaanxi (CN)

(72) Inventors: Yuehui Wang, Shaanxi (CN); Bianling Zhang, Shaanxi (CN); Manxia Tie, Shaanxi (CN); Xiaolong Lai, Shaanxi (CN); Qin Li, Shaanxi (CN); Weigang Tong, Shaanxi (CN); Guoqiang Zhang, Shaanxi (CN); Zhiqiang Du, Shaanxi (CN); Xiang Yan, Shaanxi (CN)

(73) Assignee: CHINA IWNCOMM CO., LTD., Shaanxi (CN)

( * ) Notice: Subject to any disclaimer, the term of this patent is extended or adjusted under 35 U.S.C. 154(b) by 288 days.

(21) Appl. No.: 16/482,463

(22) PCT Filed: Feb. 13, 2018

(86) PCT No.: PCT/CN2018/076618
§ 371 (c)(1),
(2) Date: Jul. 31, 2019

(87) PCT Pub. No.: WO2018/177045
PCT Pub. Date: Oct. 4, 2018

(65) Prior Publication Data
US 2021/0314170 A1 Oct. 7, 2021

(30) Foreign Application Priority Data

Apr. 1, 2017 (CN) .......................... 201710211816.2

(51) Int. Cl.
*H04L 29/06* (2006.01)
*H04L 9/40* (2022.01)
(Continued)

(52) U.S. Cl.
CPC ........ *H04L 63/0823* (2013.01); *H04L 9/0869* (2013.01); *H04L 9/3247* (2013.01);
(Continued)

(58) Field of Classification Search
CPC .................................................. H04L 63/0823
See application file for complete search history.

(56) References Cited

U.S. PATENT DOCUMENTS

| 2002/0165912 | A1* | 11/2002 | Wenocur | G06Q 10/107 709/203 |
| 2005/0138386 | A1* | 6/2005 | Le Saint | H04L 9/3226 713/185 |

(Continued)

FOREIGN PATENT DOCUMENTS

| CN | 101521883 A | 9/2009 |
| CN | 101640590 A | 2/2010 |

(Continued)

OTHER PUBLICATIONS

EPO Extended Search Report corresponding to EP Application No. 18775669.7. dated Feb. 27, 2020.
(Continued)

*Primary Examiner* — Bradley W Holder
(74) *Attorney, Agent, or Firm* — Cantor Colburn LLP

(57) ABSTRACT

A method and device for managing a digital certificate are provided. A digital certificate requesting device negotiates with a digital certificate issuing device by using an acquired authorization code, to establish a security data channel and generate a security key, and messages can be encrypted with the generated data communication key during a process of message interaction between the digital certificate requesting device and the digital certificate issuing device, thereby effectively increasing the security in data transmission. The method and device are applicable for automatically request- (Continued)

ing for, querying, updating, revoking a digital certificate and acquiring a digital certificate revocation list in various scenarios.

31 Claims, 7 Drawing Sheets

(51) Int. Cl.
 *H04L 9/08* (2006.01)
 *H04L 9/32* (2006.01)
(52) U.S. Cl.
 CPC ........ *H04L 9/3268* (2013.01); *H04L 63/0428* (2013.01); *H04L 63/205* (2013.01)

(56) References Cited

U.S. PATENT DOCUMENTS

| | | | |
|---|---|---|---|
| 2006/0269061 | A1 | 11/2006 | Balasubramanian et al. |
| 2007/0083750 | A1 | 4/2007 | Miura et al. |
| 2007/0277035 | A1 | 11/2007 | Patel et al. |
| 2008/0082818 | A1* | 4/2008 | Kim .................. H04L 63/06 713/156 |
| 2010/0250952 | A1 | 9/2010 | Pang et al. |
| 2017/0093570 | A1 | 3/2017 | Maruyama |
| 2018/0159845 | A1* | 6/2018 | Aronov ............... H04L 63/0435 |
| 2019/0173671 | A1 | 6/2019 | Yang et al. |

FOREIGN PATENT DOCUMENTS

| | | |
|---|---|---|
| CN | 102624531 A | 8/2012 |
| CN | 103973696 A | 8/2014 |
| CN | 104160656 A | 11/2014 |
| CN | 105208044 A | 12/2015 |
| CN | 105812136 A | 7/2016 |
| EP | 2634993 A1 | 9/2013 |
| JP | H08316951 A | 11/1996 |
| JP | 2002521970 A | 7/2002 |
| JP | 2004032502 A | 1/2004 |
| JP | 2005102163 A | 4/2005 |
| JP | 2006295519 A | 10/2006 |
| JP | 2009538567 A | 11/2009 |
| JP | 2011503977 A | 1/2011 |
| JP | 2019526205 A | 9/2019 |
| KR | 101326530 B1 | 11/2013 |
| KR | 20160139885 A | 12/2016 |
| WO | 0007355 A2 | 2/2000 |
| WO | 2015193945 A1 | 12/2015 |

OTHER PUBLICATIONS

JPO Notice of Reasons for Refusal for corresponding JP Application No. 2019-539969; dated Sep. 14, 2020.
JPO Notice of Reasons for Refusal for corresponding JP Application No. 2019-539969; dated May 31, 2021.
KIPO Notification of Reason for Refusal for corresponding KR Application No. 10-2019-7022430, dated Nov. 19, 2020.
CNIPA 1st Office Action for corresponding CN application No. 201710211816.2. dated Jan. 6, 2021.
International Search Report corresponding to Application No. PCT/CN2018/076618; dated May 14, 2018.

* cited by examiner

METHOD AND DEVICE FOR MANAGING DIGITAL CERTIFICATE

CROSS-REFERENCE TO RELATED APPLICATIONS

This application is the national phase of International Application No. PCT/CN2018/076618, filed on Feb. 13, 2018, which claims the benefit of priority to Chinese Patent Application No. 201710211816.2, filed on Apr. 1, 2017, the entire contents of which are hereby incorporated herein by reference in their entireties.

FIELD

The present disclosure relates to the field of network security technologies, and in particular to a method and device for managing a digital certificate.

BACKGROUND

With the development of network security technologies, it is important to ensure confidentiality and integrity of information during network transmission, which has become an important research topic in this field. An identity of a network communication entity may be verified via a digital certificate, thus the digital certificate technology may be used to realize data encryption and identity verification. The digital certificate is generally issued by a digital certificate issuing device to a digital certificate requesting device, to identify the identity of the digital certificate requesting device.

There is already a method for automatically requesting for a digital certificate in the conventional technology, which may be performed to request for, update and issue a digital certificate via a wireless local area network. With this method, the digital certificate requesting device may transmit a message to a digital certificate issuing device via the wireless local area network, to inform the digital certificate issuing device of a digital certificate generating manner supported by the digital certificate requesting device, to facilitate the digital certificate issuing device to generate a digital certificate. However, with this method, messages transmitted between the digital certificate requesting device and the digital certificate issuing device are in plaintext, and each of the digital certificate requesting device and the digital certificate issuing device only verifies integrity of the messages, to determine whether the message is falsified. Therefore, with this method, only the integrity of data is ensured, while the authenticity and confidentiality of the data can not be ensured, resulting in that the data is not protected effectively. Further, since the messages are transmitted in plaintext, there is also a disadvantage of low security especially in a case that data is transmitted between the digital certificate requesting device and the digital certificate issuing device via other kinds of networks.

SUMMARY

A method and device for managing a digital certificate are provided according to the present disclosure, with which a security data channel for transmitting data is established between a digital certificate requesting device and a digital certificate issuing device, and messages transmitted between the digital certificate requesting device and the digital certificate issuing device are encrypted, thereby effectively improving security in digital certificate management.

The following technical solutions are provided according to the present disclosure.

In a first aspect, a method for managing a digital certificate is provided according to the present disclosure. The method includes: negotiating, by a digital certificate requesting device, with a digital certificate issuing device by using an acquired authorization code, to establish a security data channel and generate a security key, where the security key includes at least a data communication key; transmitting, by the digital certificate requesting device, a digital certificate management request message to the digital certificate issuing device through the security data channel, where the digital certificate management request message is encrypted with the data communication key; receiving the digital certificate management request message by the digital certificate issuing device, and transmitting, by the digital certificate issuing device, a digital certificate management response message to the digital certificate requesting device through the security data channel, where the digital certificate management response message is encrypted with the data communication key; receiving the digital certificate management response message by the digital certificate requesting device through the security data channel; and processing the digital certificate management response message by the digital certificate requesting device, to obtain a processing result.

In second aspect, a digital certificate requesting device is provided according to the present disclosure. The device includes a security data channel establishing unit, an encrypting unit, a transmitting unit, a receiving unit and a processing unit. The security data channel establishing unit is configured to negotiate with a digital certificate issuing device by using an acquired authorization code, to establish a security data channel and generate a security key. The security key includes a data communication key. The encrypting unit is configured to encrypt a digital certificate management request message with the data communication key. The transmitting unit is configured to transmit the digital certificate management request message to the digital certificate issuing device through the security data channel. The digital certificate management request message is encrypted with the data communication key. The receiving unit is configured to receive a digital certificate management response message from the digital certificate issuing device through the security data channel. The digital certificate management response message is encrypted with the data communication key. The processing unit is configured to process the digital certificate management response message, to obtain a processing result.

In a third aspect, a digital certificate requesting device is further provided according to the present disclosure. The device includes a memory and one or more programs. The one or more programs are stored in the memory. The one or more programs include instructions which, when executed by one or more processors, cause the one or more processors to perform the following steps of: negotiating with a digital certificate issuing device by using an acquired authorization code, to establish a security data channel and generate a security key, where the security key includes a data communication key; encrypting a digital certificate management request message with the data communication key; transmitting the digital certificate management request message to the digital certificate issuing device through the security data channel, where the digital certificate management request message is encrypted with the data communication key; receiving a digital certificate management response message from the digital certificate issuing device through the security data channel, where the digital certificate management response message is encrypted with the data communication key; and processing the digital certificate management response message to obtain a processing result.

In a fourth aspect, a digital certificate issuing device is provided according to the present disclosure. The device includes a security data channel establishing unit, a receiving unit, a processing unit, an encrypting unit and a transmitting unit. The security data channel establishing unit is configured to negotiate with a digital certificate requesting device by using an acquired authorization code, to establish a security data channel and generate a security key. The security key includes a data communication key. The receiving unit is configured to receive a digital certificate management request message transmitted from the digital certificate requesting device through the security data channel. The digital certificate management request message is encrypted with the data communication key. The processing unit is configured to process the received digital certificate management request message and generate a digital certificate management response message. The encrypting unit is configured to encrypt the digital certificate management response message with the data communication key. The transmitting unit is configured to transmit the digital certificate management response message to the digital certificate requesting device through the security data channel. The digital certificate management response message is encrypted with the data communication key.

In a fifth aspect, a digital certificate issuing device is provided according to the present disclosure. The device includes a memory and one or more programs. The one or more programs are stored in the memory. The one or more programs comprise instructions which, when executed by one or more processors, cause the one or more processors to perform the following steps of: negotiating with a digital certificate requesting device by using an acquired authorization code, to establish a security data channel and generate a security key, where the security key includes a data communication key; receiving a digital certificate management request message transmitted from the digital certificate requesting device through the security data channel, where the digital certificate management request message is encrypted with the data communication key; processing the received digital certificate management request message and generating a digital certificate management response message; encrypting the digital certificate management response message with the data communication key; and transmitting the digital certificate management response message to the digital certificate requesting device through the security data channel, where the digital certificate management response message is encrypted with the data communication key.

With the method and device for managing a digital certificate according to the present disclosure, a digital certificate requesting device can negotiate with a digital certificate issuing device by using an acquired authorization code, to establish a security data channel and generate a security key, and messages can be encrypted with the generated data communication key during a process of the message interaction between the digital certificate requesting device and the digital certificate issuing device, thereby effectively improving the security in data transmission. The method and device are applicable for automatically requesting for, querying, updating, revoking a digital certificate and acquiring a digital certificate revocation list in various scenarios.

BRIEF DESCRIPTION OF THE DRAWINGS

In order to more clearly illustrate technical solutions in the embodiments of the present disclosure or in the conventional technology, drawings to be used in the description of the embodiments or the conventional technology are briefly described below. It is apparent that the drawings in the following description show only some embodiments of the present disclosure, and other drawings may be obtained by those skilled in the art from the drawings without any creative work.

DETAILED DESCRIPTION OF EMBODIMENTS

A method and device for managing a digital certificate are provided according to the embodiments of the present disclosure, with which a security data channel for transmitting data is established between a digital certificate requesting device and a digital certificate issuing device, and messages transmitted between the digital certificate requesting device and the digital certificate issuing device is encrypted, thereby effectively improving security in digital certificate management.

For a better understanding of the technical solutions of the present disclosure by those skilled in the art, the technical solutions in the embodiments of the present disclosure are clearly and completely described with reference to the drawings in the embodiments of the present disclosure. It is apparent that the embodiments described herein are only some rather than all of embodiments of the present disclosure. Based on the embodiments of the present disclosure, all other embodiments obtained by those skilled in the art without any creative work should fall within the protection scope of the present disclosure.

Figure 1:
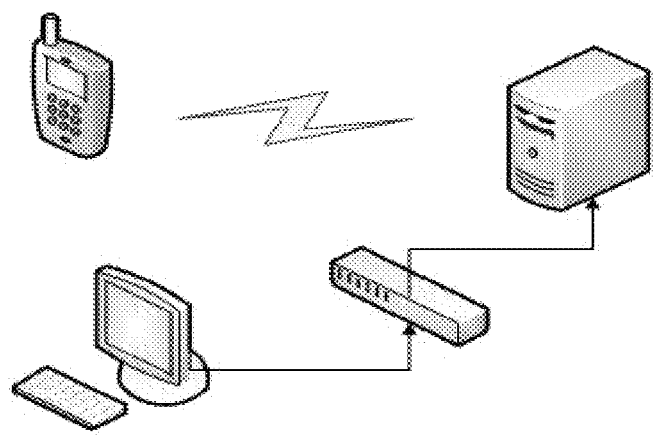
FIG. 1 schematically shows an application scenario to which the embodiments of the present disclosure may be applied.

Reference is made to FIG. 1, which shows an exemplary application scenario to which an embodiment of the present disclosure may be applied. The method and device according to the embodiment of the present disclosure may be applied to the scenario as show in FIG. 1. A digital certificate requesting device and a digital certificate issuing device may be communicated with each other via a network in any form of a wired and/or wireless communication (for example, a WLAN, an LAN, a cellular network and a coaxial cable). As shown in FIG. 1, the digital certificate requesting device may include but be not limited to a conventional, being developed or to-be-developed smartphone, a non-smartphone, a tablet computer, a laptop personal computer, a desktop personal computer, a minicomputer, a medium-scale computer, a mainframe computer and the like. The digital certificate requesting device may transmit a message to the digital certificate issuing device (for example, a CA server in a certificate authority) via a network applicable to both of the digital certificate requesting device and the digital certificate issuing device to request for downloading or updating a certificate and the like. It is to be noted that the embodiments of the present disclosure may be applied to various industries such as wireless operation network, aviation, transportation, electric power, broadcast radio and television, finance, healthcare, education, and industry and commerce. It is to be noted that the above application scenarios are shown to only facilitate understanding the technical solutions of the present disclosure, and the embodiments of the present disclosure are not limited thereto. The embodiments of the present disclosure may be applied to any proper scenarios.

A method for managing a digital certificate according to an exemplary embodiment of the present disclosure is descried below with reference to FIGS. 2 to 6.

Figure 2:
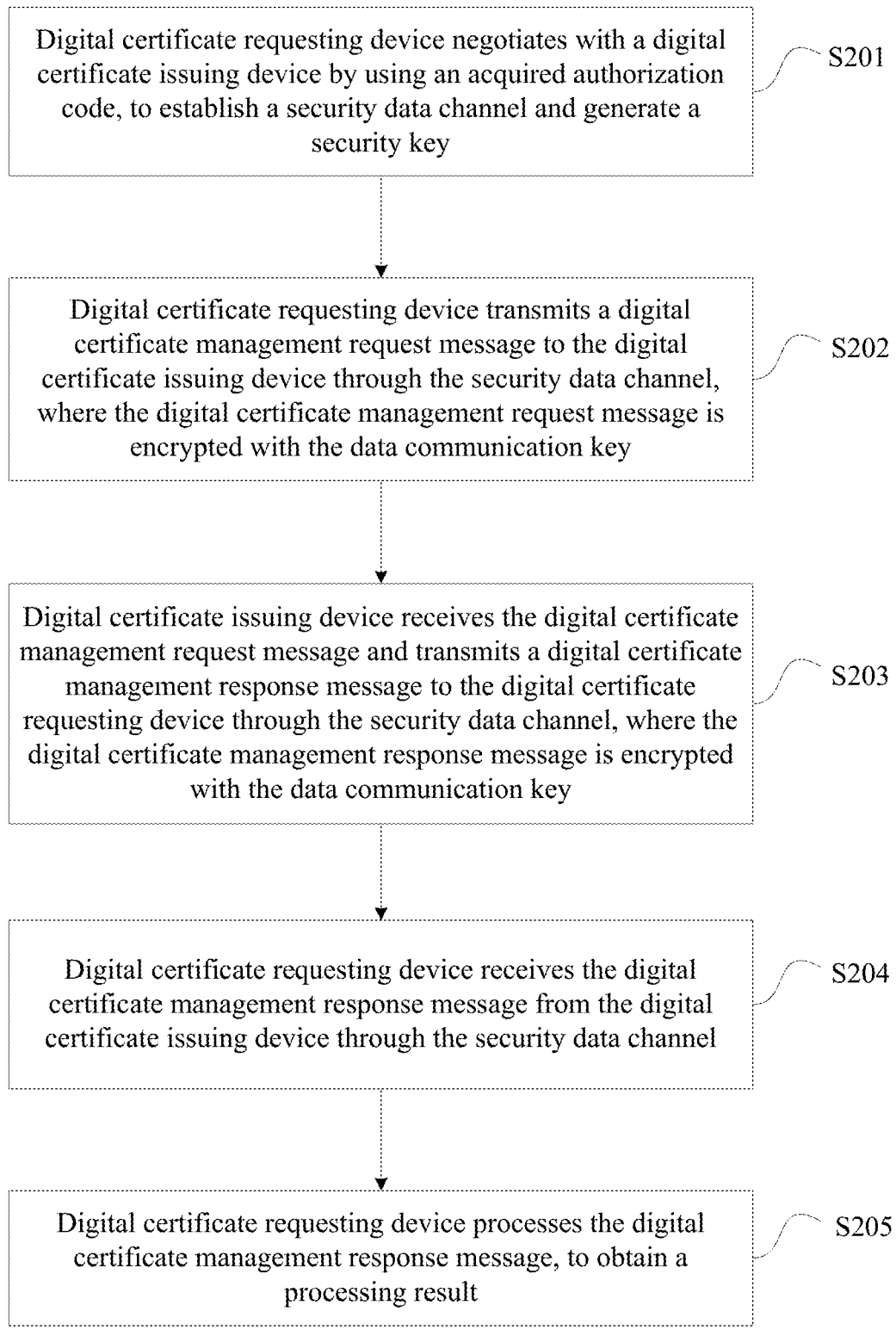
FIG. 2 is a flowchart of a method for managing a digital certificate according to an embodiment of the present disclosure.

Reference is made to FIG. 2, which is a flowchart of a method for managing a digital certificate according to an embodiment of the present disclosure. As shown in FIG. 2, the method includes the following steps S201 to S205.

In step S201, a digital certificate requesting device negotiates with a digital certificate issuing device by using an acquired authorization code, to establish a security data channel and generate a security key. The security key includes a data communication key.

In practice, a digital certificate requester may request a digital certificate issuer for an authorization code which is used to download a digital certificate. The digital certificate requester may be, for example, a digital certificate requesting device. The digital certificate issuer may be, for example, a digital certificate issuing device. A manner for requesting for the authorization code is not specifically limited in the present disclosure. For example, the digital certificate requester may request for the authorization code from the digital certificate issuer via a short message, an Email, a dedicated request or the like. The digital certificate issuer may transmit the authorization code to the digital certificate requester in a certain manner. For example, the digital certificate issuer may transmit the authorization code to the digital certificate requester via a short message, an Email, a dedicated request or the like. Generally, the authorization code is generated by the digital certificate issuer. The authorization code may be generated in a case where the digital certificate requester requests for the authorization code, or may be generated in advance. The authorization code may be in the form of a combination of letters and/or numbers and/or symbols, and has a certain length and a certain valid period. If the valid period is expired, the authorization code is invalidated. During operation, the digital certificate issuer issues different authorization codes for different digital certificate requesters.

In practice, the digital certificate requesting device may negotiate with the digital certificate issuing device by using an acquired authorization code, to establish a security data channel. The security data channel is used for security data transmission. During a process of establishing the security data channel, the digital certificate requesting device may generate a security key by using the authorization code. The security key may include one or more keys. The one or more keys include a data communication key. The security key may further include a data session key. A message transmitted between the digital certificate requesting device and the digital certificate issuing device through the security data channel may be encrypted with the data communication key. It is to be noted that both the digital certificate requesting device and the digital certificate issuing device may generate the security key, to facilitate message encryption and decryption. The data session key may be used to encrypt certificate request data or certificate response data. The certificate request data is carried in a digital certificate management request message, and the certificate response data is carried in a digital certificate management response message.

In step S202, the digital certificate requesting device transmits the digital certificate management request message to the digital certificate issuing device through the security data channel. The digital certificate management request message is encrypted with the data communication key.

According to the present disclosure, the digital certificate management request message is encrypted. Specifically, the digital certificate management request message is encrypted with the data communication key generated in step S201, thereby effectively improving security in message transmission. It is to be noted that data carried in the digital certificate management request message may be encrypted once or twice. For example, the digital certificate management request message may be encrypted with the data communication key when being transmitted through the security data channel, and then is transmitted to the digital certificate issuing device. For example, the certificate request data carried in the digital certificate management request message is encrypted with a key in the security key, for example, the data session key before the digital certificate management request message is transmitted, and then the digital certificate management request message is encrypted once again when being transmitted through the security data channel. In order to ensure security, the digital certificate management request message is encrypted twice respectively with different security keys (i.e., the data communication key and the data session key). The digital certificate requesting device may predetermine, with the digital certificate issuing device, the number of times for encryption, an encryption algorithm and types of the keys (i.e., the data communication key and the data session key) for encrypting.

In step S203, the digital certificate issuing device receives the digital certificate management request message and transmits a digital certificate management response message to the digital certificate requesting device through the security data channel. The digital certificate management response message is encrypted with the data communication key.

Specifically, after receiving the digital certificate management request message, the digital certificate issuing device: decrypts the digital certificate management request message with the generated security key; performs an operation based on the data carried in the digital certificate management request message and generates the digital certificate management response message; and transmits the digital certificate management response message to the digital certificate requesting device.

According to the present disclosure, the digital certificate management response message is encrypted. Specifically, the digital certificate management response message is encrypted with the data communication key generated in step S201, thereby effectively improving security in message transmission. It is to be noted that digital certificate management response message may be encrypted once or twice. For example, in step S202, the data carried in the digital certificate management request message is encrypted with a key in the security key, for example, the data session key, before the digital certificate management request message is transmitted, and then the digital certificate management request message is encrypted once again with the data communication key during the digital certificate management request message is transmitted through the security data channel. Further, the digital certificate management response message may be encrypted twice respectively with the data session key and the data communication key. The digital certificate requesting device may predetermine, with the digital certificate issuing device, the number of times of the encryption, an encryption algorithm and types of the keys (i.e., the data communication key and the data session key) for encrypting.

In step S204, the digital certificate requesting device receives the digital certificate management response message from the digital certificate issuing device through the security data channel.

The digital certificate management response message is encrypted with the data communication key.

In practice, the messages and the interaction manner used during a process of message interaction between the digital certificate requesting device and the digital certificate issuing device are not limited in the present disclosure. Any message and interaction manner that can perform automatic digital certificate request, query, update and revocation and digital certificate revocation list acquisition should fall within the protection scope of the present disclosure. In some embodiments, the digital certificate management request message may include digital certificate request information, digital certificate acquisition information, digital certificate revocation information, digital certificate revocation list information and the like. The digital certificate management response message includes digital certificate response information.

In step S205, the digital certificate requesting device processes the digital certificate management response message, to obtain a processing result.

In practice, the digital certificate requesting device decrypts and verifies the digital certificate management response message, to obtain contents in the digital certificate management response message. Further, the digital certificate requesting device determines a to-be-used digital certificate as needed, then installs and updates the digital certificate.

It is to be understood that, in practice, the digital certificate management request message carries certificate request data, and the digital certificate management response message carries certificate response data. There may be the following specific implementations (1) to (3) based on the case whether to encrypt the certificate request data and/or the certificate response data.

In the implementation (1), the certificate request data and the certificate response data are both transmitted in plaintext. Each of the digital certificate management request message and the digital certificate management response message is encrypted with the data communication key in the security data channel, to realize one-time encryption.

In this case, the digital certificate management request message is encrypted with the data communication key in a way that the digital certificate management request message is encrypted with the data communication key in the security data channel. The digital certificate management response message is encrypted with the data communication key in a way that the digital certificate management response message is encrypted with the data communication key in the security data channel.

In the implementation (2), in a case that the security key further includes a data session key, the certificate request data is encrypted with the data session key for a primary encryption, and the certificate response data is not encrypted, i.e., is in plaintext. The digital certificate management request message is encrypted with the data communication key for a secondary encryption. The digital certificate management response message is encrypted one-time with the data communication key.

In this case, the digital certificate management request message is encrypted with the data communication key in a way that the certificate request data carried in the digital certificate management request message is encrypted with the data session key before the digital certificate management request message is encrypted with the data communication key in the security data channel.

In this case, the digital certificate management response message is encrypted with the data communication key in a way that the digital certificate management response message is encrypted with the data communication key in the security data channel.

In the implementation (3), in a case that the security key further includes a data session key, the certificate request data is encrypted with the data session key for a primary encryption, and the certificate response data is also encrypted with the data session key for a primary encryption. The certificate request data and the certificate response data are encrypted with the same data session key in the same encryption manner. Each of the digital certificate management request message and the digital certificate management response message is encrypted with the data communication key for a secondary encryption.

In this case, the digital certificate management request message is encrypted with the data communication key in a way that the certificate request data carried in the digital certificate management request message is encrypted with the data session key before the digital certificate management request message is encrypted with the data communication key in the security data channel.

In this case, the digital certificate management response message is encrypted with the data communication key in a way that the certificate response data carried in the digital certificate management response message is encrypted with the data session key before the digital certificate management response message is encrypted with the data communication key in the security data channel.

The method further includes the following steps S206 to S207.

In step S206, the digital certificate requesting device transmits a digital certificate management confirmation message to the digital certificate issuing device through the security data channel. The digital certificate management confirmation message is encrypted with the data communication key.

In practice, the digital certificate management confirmation message is encrypted. Specifically, the digital certificate management confirmation message is encrypted with the data communication key generated in step S201, thereby effectively improving security in message transmission.

In step S207, the digital certificate issuing device receives and processes the digital certificate management confirmation message.

In this embodiment of the present disclosure, the digital certificate requesting device may negotiate with the digital certificate issuing device by using the acquired authorization code, to establish the security data channel and generate the security key. During the process of message interactions between the digital certificate requesting device and the digital certificate issuing device, a message may be encrypted with the generated security key, thereby effectively improving security in message transmission. In addition, the method is applicable to digital certificate request, query, update, revocation and revocation list acquisition in various scenarios.

According to the present disclosure, during the process of message interactions between the digital certificate requesting device and the digital certificate issuing device, it is required to re-transmit the message if no response message is received in a certain time period after the message is transmitted.

In order to facilitate those skilled in the art to clearly understand the embodiments of the present disclosure in specific scenarios, a specific embodiment is taken as an example to describe the embodiments of the present disclosure hereinafter. It is to be noted that this specific embodiment is described to only facilitate those skilled in the art to clearly understand the embodiments, and the present disclosure is not limited thereto.

Figure 3:
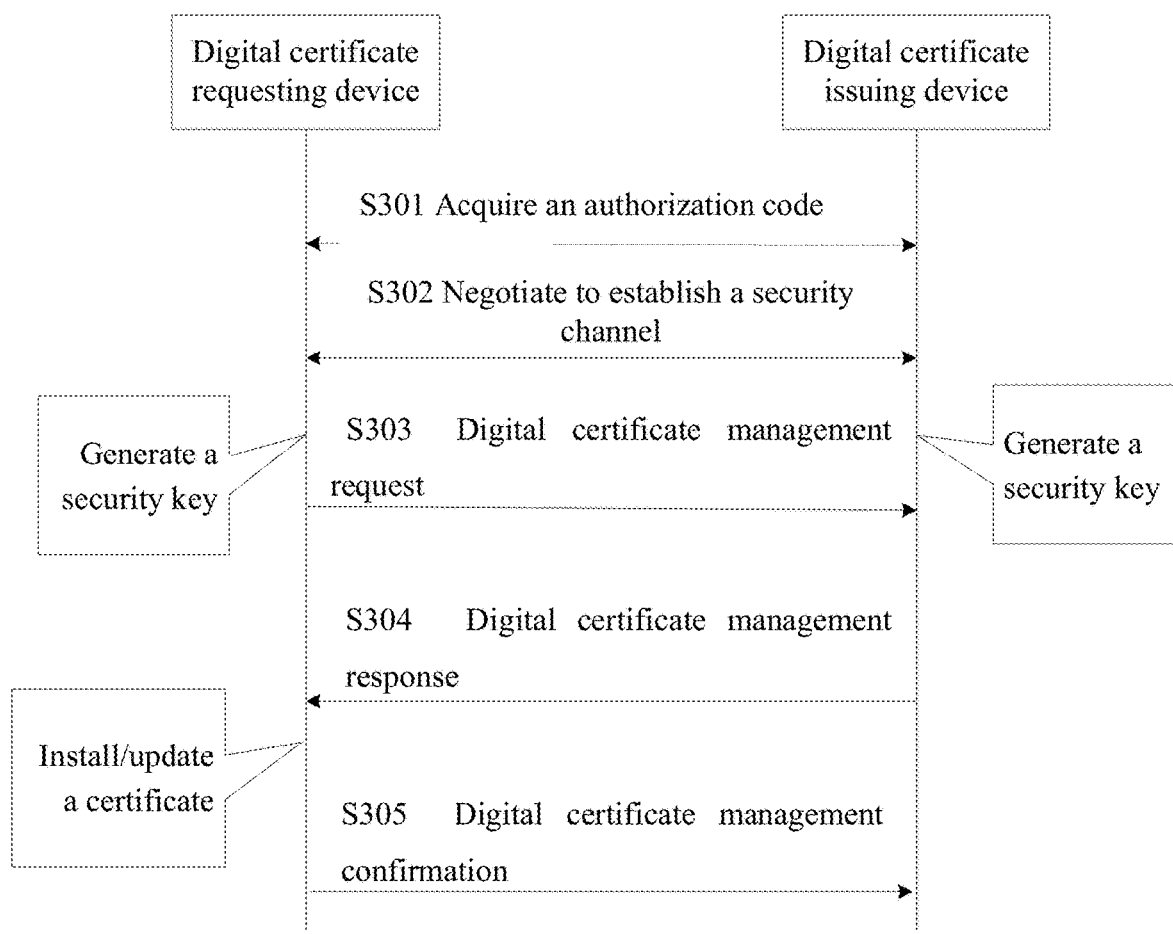
FIG. 3 is a flowchart of a method for managing a digital certificate according to another embodiment of the present disclosure.

Reference is made to FIG. 3, which is a flowchart of a method for managing a digital certificate according to another embodiment of the present disclosure. As shown in FIG. 3, the method includes the following steps S301 to S305.

In step S301, a digital certificate requesting device acquires an authorization code.

In practice, the digital certificate requesting device requests, from a digital certificate issuing device, for the authorization code which is used to download a digital certificate, and acquires the authorization code from the digital certificate issuing device.

In step S302, the digital certificate requesting device negotiates with the digital certificate issuing device by using the acquired authorization code, to establish a security data channel and generate a security key.

In practice, in order to ensure security in message transmission during a process of issuing the digital certificate, the digital certificate requesting device may negotiate with the digital certificate issuing device, to establish the security data channel. The digital certificate requesting device generates, by using the authorization code, a security key for transmitting data through the security data channel.

A manner for establishing the security data channel is not limited in the present disclosure, as long as a sharing security key for transmitting data is generated by using the authorization code. In practice, the security data channel may be established through the following steps S302A to S302C.

In step S302A, the digital certificate requesting device negotiates with the digital certificate issuing device, to establish the security data channel.

In step S302B, the digital certificate requesting device generates, with the digital certificate issuing device, the security key in the security data channel by using the random number and identity information that are acquired during the negotiation and the authorization code.

The security key may include a data communication key, and may further include a data session key. The data communication key is used by the digital certificate requesting device and the digital certificate issuing device to encrypt a message during the process of message interaction through the security data channel. The data session key is used to encrypt certificate request data and/or certificate response data carried in the message before the message is transmitted.

In step S302C, the digital certificate requesting device verifies, with the digital certificate issuing device, a security channel confirmation message by using an integrity verify code.

Figure 4:
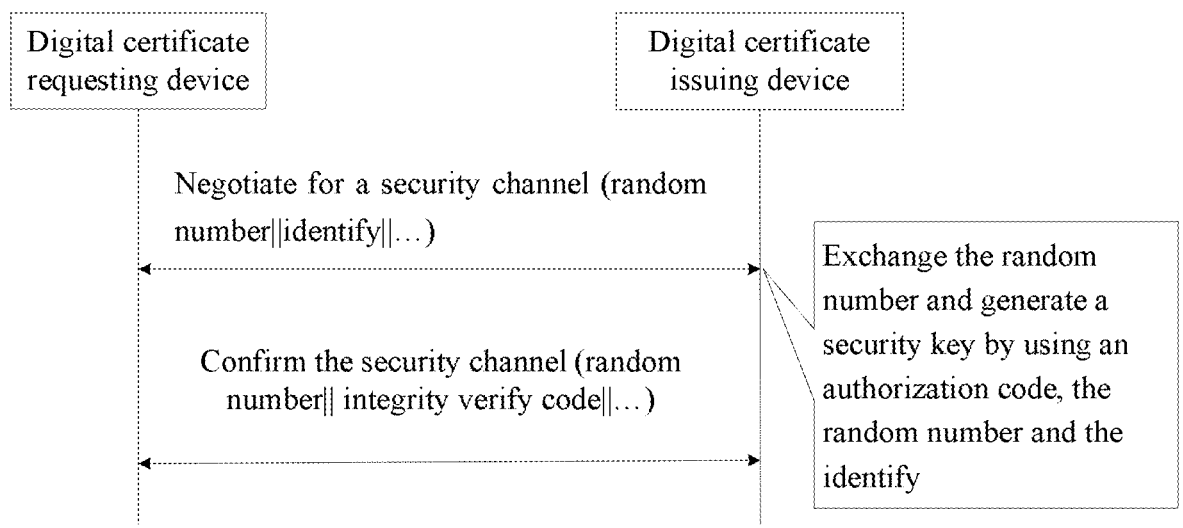
FIG. 4 is a schematic diagram showing a process of negotiating to establish a security data channel according to an embodiment of the present disclosure.

In practice, reference is made to FIG. 4, which is a schematic diagram showing a process of negotiating to establish a security data channel. Specifically, the digital certificate requesting device negotiates with the digital certificate issuing device to establish the security data channel in a way that the digital certificate requesting device transmits a first random number and first identity information to the digital certificate issuing device and receives a second random number and second identity information from the digital certificate issuing device. The first random number is randomly generated by the digital certificate requesting device. The first identity information may be information of an identifier of the digital certificate requesting device, for example, an IP address, a MAC address, an Email address, a fully qualified domain name string or an international mobile subscriber identification number (IMSI). The second random number is randomly generated by the digital certificate issuing device. The second identity information may be information of an identifier of the digital certificate issuing device, for example, an IP address, a MAC address, an Email address, a fully qualified domain name string or an international mobile subscriber identification number (IMSI). The transmission of the random number and the identity information between the digital certificate requesting device and the digital certificate issuing device may be initiated by either the digital certificate requesting device or the digital certificate issuing device, and the manner of the transmission is not limited in the present disclosure.

In some embodiments, the digital certificate requesting device generates, with the digital certificate issuing device, the security key in the security data channel by using the random number and the identity information that are acquired during the negotiation and the authorization code in a way that the digital certificate requesting device generates, with the digital certificate issuing device, the security key by using the authorization code, the first random number, the first identity information, the second random number and the second identity information. It is to be noted that the security key generated by the digital certificate requesting device is the same as the security key generated by the digital certificate issuing device. The security key may include one or more keys. For example, the security key may include a data communication key for data transmission, may further include an integrity verify key for integrity verification, and may further include a data session key for certificate request data and/or certificate response data encryption.

In some embodiments, the security key further includes an integrity verify key. The digital certificate requesting device verifies, with the digital certificate issuing device, a security key in the security data channel by using an integrity verify code in a way that the digital certificate requesting device generates, with the digital certificate issuing device, the integrity verify code by using the random number and the integrity verify key, and verifies the security channel confirmation message by using the integrity verify code.

In step S303, the digital certificate requesting device transmits a digital certificate management request message to the digital certificate issuing device through the security data channel.

In practice, the digital certificate requesting device transmits the digital certificate management request message to the digital certificate issuing device through the security data channel after the digital certificate management request message is encrypted. In a case that the digital certificate requesting device does not have a digital certificate issued by the digital certificate issuing device, the digital certificate management request message carries certificate information which is required to be included in a new digital certificate. In a case that the digital certificate requesting device has a digital certificate issued by the digital certificate issuing device, the digital certificate management request message transmitted from the digital certificate requesting device carries information of an existing digital certificate, such that the digital certificate issuing device may query and update the digital certificate.

In some embodiments, the digital certificate management request message may include digital certificate request information, digital certificate acquisition information, digital certificate revocation information, digital certificate revocation list information and the like. In practice, the digital certificate request information, the digital certificate acquisition information, the digital certificate revocation information, and the digital certificate revocation list information may be indicated but are not limited by the forms shown in Table 1.

TABLE 1

Types of information in a digital certificate management request message

| Message | Type value | Meanings (type of information) |
|---|---|---|
| Digital certificate management request message | 2 | Certificate request |
| | 4 | Certificate acquisition |
| | 5 | Certificate revocation |
| | 6 | Certificate revocation list |

For example, in a case that a type value of information in the digital certificate management request message is equal to 2, the information represents the certificate request information which is used to request for a new digital certificate. In a case that the type value of information in the digital certificate management request message is equal to 4, the information represents the certificate acquisition information which is used to query or update an existing digital certificate. In a case that the type value of information in the digital certificate management request message is equal to 5, the information represents the certificate revocation information which is used to revoke the existing digital certificate. In a case that the type value of information in the digital certificate management request message is equal to 6, the information represents the certificate revocation list information which is used to request for a certificate revocation list.

In practice, fields in the certificate request information may be indicated but is not limited by the form shown in Table 2.

TABLE 2

Certificate request information

| Certificate generating manner | Certificate request data |
|---|---|

In practice, fields in the certificate acquisition information may be indicated but is not limited by the form shown in Table 3.

TABLE 3

Certificate acquisition information

| Name of an issuing device | Ser. No. |
|---|---|

In practice, fields in the certificate revocation information may be indicated but is not limited by the form shown in Table 4.

TABLE 4

Certificate revocation information

| Name of an issuing device | Ser. No. | Reason for revoking |
|---|---|---|

In practice, a field in the certificate revocation list information may be indicated but is not limited by the form shown in Table 5.

TABLE 5

Certificate revocation list information

| Name of an issuing device |
|---|

The certificate request data carried in the certificate request information is not limited according to the present disclosure.

In some embodiments, the certificate request data carried in the digital certificate management request message includes certificate request information, a signature algorithm identifier and a signature value.

The certificate request information may include, for example, information of a version, a name of a holder, a public key of the holder and an extension. These elements of the information are brief and may meet a basic requirement for issuing a certificate. The signature value is obtained by encrypting the certificate request information with a private key by using a signature algorithm corresponding to the signature algorithm identifier after the digital certificate requesting device generates a public/private key pair. The digital certificate issuing device verifies a signature based on the information of the public key of the holder in the certificate request information, to determine whether the public and private keys belong to the digital certificate requesting device. It may be determined whether the public and private keys belong to the entity by using the signature algorithm identifier and the signature value.

In other embodiments, the certificate request information in the certificate request data may further include information of a serial number, a name of an issuer and a valid period. With the above information, a certificate issuing function may be enriched. For example, a digital certificate requester may request limiting certain information in the certificate. In this case, the certificate request data may be encrypted. Specifically, the certificate request data is obtained by encrypting the certificate request information, the signature algorithm identifier and the signature value by the digital certificate requesting device with the generated data session key after the security data security is established. Further, based on the above embodiments, in a case that two or more encryption algorithms are supported by the digital certificate requesting device and/or the digital certificate issuing device, an encryption algorithm identifier may be included in the certificate request data. Specifically, the certificate request data includes the encryption algorithm identifier and data obtained by encrypting the certificate request information, the signature algorithm identifier and the signature value with the data session key by using an encryption algorithm corresponding to the encryption algorithm identifier. This certificate request data has more structural elements and may be used widely. The certificate request data is protected by encryption while verifying an entity to which the public and private keys belong. In a case that there is a security data channel, the certificate request data may be encrypted twice due to this configuration of the certificate request data, thereby further improving security in data transmission.

In step S304, the digital certificate requesting device receives a digital certificate management response message from the digital certificate issuing device through the security data channel.

In practice, the digital certificate issuing device transmits the digital certificate management response message to the digital certificate requesting device through the security data channel after the digital certificate management response message is encrypted. In a case that the digital certificate issuing device determines that the digital certificate requesting device needs to request for a new digital certificate, the digital certificate management response message includes a new digital certificate which is generated by the digital certificate issuing device based on the certificate request data included in the digital certificate request information. In a case that the digital certificate issuing device determines that the digital certificate requesting device needs to query or update an existing digital certificate, the digital certificate management response message carries a queried or updated digital certificate.

In practice, the digital certificate issuing device performs the determination and process based on the type of information in the digital certificate management request message. In a case that the digital certificate issuing device receives the digital certificate request information and determines that there is the information of the requested digital certificate, the digital certificate issuing device issues a new digital certificate based on the certificate request data. If the digital certificate issuing device determines that there is the information of an existing digital certificate included in the certificate acquisition information, the digital certificate issuing device queries the existing digital certificate based on a name of an issuing device and a serial number. If the digital certificate issuing device determines that there are a name of an issuing device and a serial number included in the certificate revocation information, the digital certificate issuing device queries an existing digital certificate based on the name of an issuing device and the serial number and revokes the existing digital certificate. If the digital certificate issuing device determines that there is a certificate revocation list, the digital certificate issuing device queries the certificate revocation list based on the name of an issuing device. The digital certificate issuing device carries the above certificate in the digital certificate management response message. The digital certificate management response message may be indicated but is not limited by the form shown in Table 6.

TABLE 6

Types of information in a digital certificate management response message

| Message | Type value | Meanings (type of information) |
|---|---|---|
| Digital certificate management response message | 3 | Certificate response |

The certificate response information may be indicated but is not limited by the format shown in Table 7.

TABLE 7

Format of certificate response information

| Certificate generating type | Certificate response data |
|---|---|

The certificate generating type may be as shown in Table 8, which shows different types of certificates corresponding to the holder of the certificate.

TABLE 8

Types of certificates

| Type value | Meanings |
|---|---|
| 1 | Client certificate |
| 2 | AS certificate |
| 3 | CA certificate |
| 4 | Certificate revocation list | where the AS certificate indicates an authentication server certificate, and the CA certificate indicates a certificate authority certificate.

In practice, the digital certificate management response message is encrypted. Specifically, in a case that there is the security data channel, the digital certificate management response message is encrypted with the generated data communication key, thereby improving security in the message transmission. It is to be noted that the digital certificate management response message may be encrypted once or twice. For example, the certificate request data carried in the digital certificate management request message is encrypted for primary encryption with a key such as the data session key in the security key before the digital certificate management request message is transmitted, and the digital certificate management request message is encrypted with the data communication key for secondary encryption during the digital certificate management request message is transmitted through the security data channel. Further, the certificate response data carried in the digital certificate management response message may also be encrypted for secondary encryption with the data session key and the data communication key. Further, in a case that two or more encryption algorithms are supported by the digital certificate requesting device and/or the digital certificate issuing device, an encryption algorithm identifier may be included in the certificate response data. Specifically, the certificate response data includes the encryption algorithm identifier and data obtained by encrypting the certificate response data with the data session key by using an encryption algorithm corresponding to the encryption algorithm identifier.

In step S305, the digital certificate requesting device processes the digital certificate management response message, to obtain a processing result.

Further, the digital certificate requesting device determines a to-be-used digital certificate as needed.

The method may further include the following step S306.

In step S306, the digital certificate requesting device transmits a digital certificate management confirmation message to the digital certificate issuing device through the security data channel. The digital certificate management confirmation message is encrypted with the data communication key.

Figure 5:
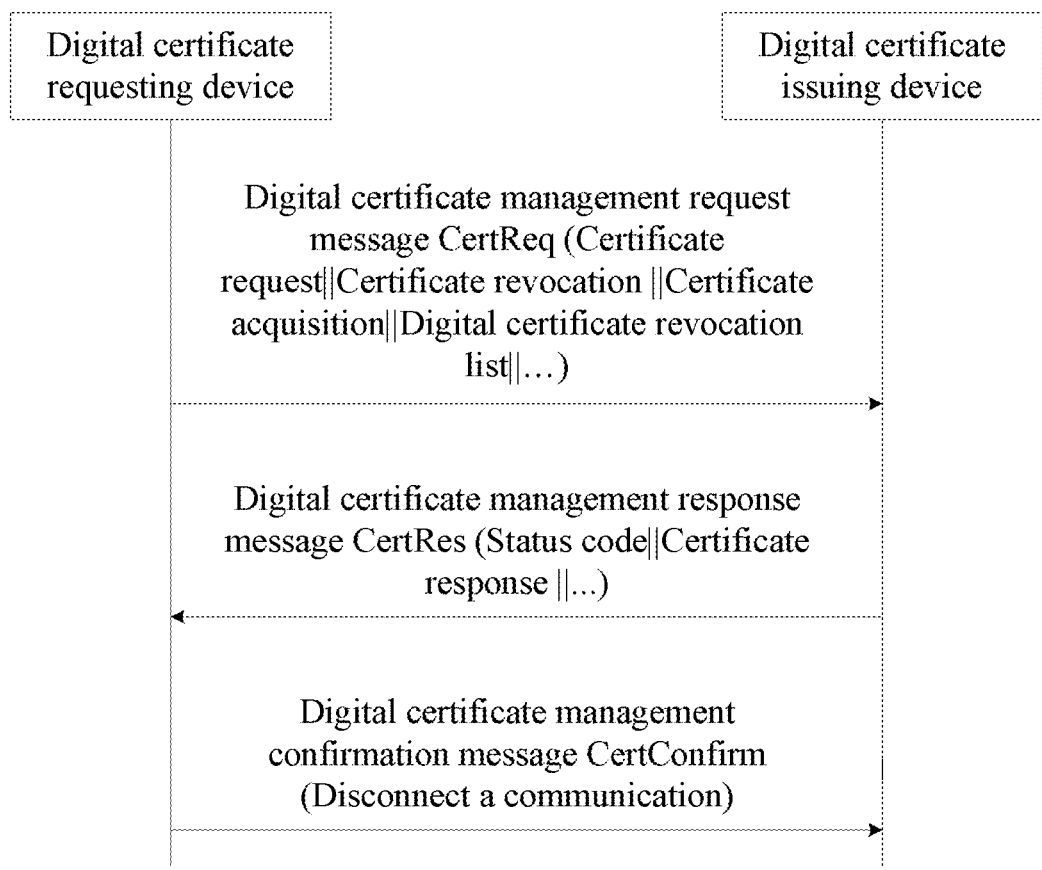
FIG. 5 is a schematic diagram showing contents of messages generated in a method for automatically requesting for, querying, updating and revoking a digital certificate as well as acquiring a digital certificate revocation list according to an embodiment of the present disclosure.

In the embodiments of the present disclosure, a secure and reliable data transmission channel is established through the above steps S301 to S302, and the digital certificate request, query and update is performed automatically through the message interactions in the above three steps S303, S304 and S305, thereby managing the digital certificate effectively, securely and reliably. Reference is made to FIG. 5, which is a schematic diagram showing contents of messages generated in a process of automatic digital certificate request, query, update, revocation and revocation list acquisition. As shown in FIG. 5, a digital certificate management request message CertReq may include digital certificate request information, digital certificate acquisition information, digital certificate revocation information, digital certificate revocation list information and the like. A digital certificate management response message CertRes may include digital certificate response information and the like. A digital certificate management confirmation message CertConfirm may be used to disconnect the communication between the digital certificate requesting device and the digital certificate issuing device.

The method for managing a digital certificate according to the present disclosure is described above, which is performed at a side of the digital certificate requesting device. It is to be understood by those skilled in the art that the method according to the present disclosure may also be performed at a side of the digital certificate issuing device, the processes of which may be performed corresponding to the processes shown in FIGS. 2 to 5. For example, the method, when being performed at the side of the digital certificate issuing device, may further includes: negotiating, by the digital certificate issuing device, with the digital certificate requesting device by using an authorization code, to establish a security data channel and generate a security key, where the security key includes a data communication key; receiving, by the digital certificate issuing device, the digital certificate management request message transmitted from the digital certificate requesting device through the security data channel, where the digital certificate management request message is encrypted with the data communication key; processing, by the digital certificate issuing device, the received digital certificate management request message and generating a digital certificate management response message; and transmitting, by the digital certificate issuing device, the digital certificate management response message to the digital certificate requesting device through the security data channel, where the digital certificate management response message is encrypted with the data communication key.

In some embodiments, the method further includes: receiving and processing, by the digital certificate issuing device, a digital certificate management confirmation message which is generated by the digital certificate requesting device and transmitted from the digital certificate requesting device through the security data channel.

In some embodiments, the negotiating by the digital certificate issuing device with the digital certificate requesting device by using the authorization code to establish the security data channel and generate the security key includes: negotiating by the digital certificate issuing device with the digital certificate requesting device to establish the security data channel; generating, by the digital certificate issuing device with the digital certificate requesting device, the security key in the security data channel by using the random number and identity information that are acquired during the negotiation and the authorization code; and verifying, by the digital certificate issuing device with the digital certificate requesting device, a security channel confirmation message by using an integrity verify code.

In some embodiments, the negotiating by the digital certificate issuing device with the digital certificate requesting device to establish the security data channel includes: transmitting, by the digital certificate issuing device, a second random number and second identity information to the digital certificate requesting device, and receiving, by the digital certificate issuing device, a first random number and first identity information from the digital certificate requesting device.

In some embodiments, the generating, by the digital certificate issuing device with the digital certificate requesting device, the security key in the security data channel by using the random number and the identity information that are acquired during the negotiation and the authorization code includes: generating, by the digital certificate issuing device, the security key by using the authorization code, the first random number, the first identity information, the second random number and the second identity information.

For specific implementations, reference may be made to the method shown in FIGS. 2 to 5.

Figure 6:
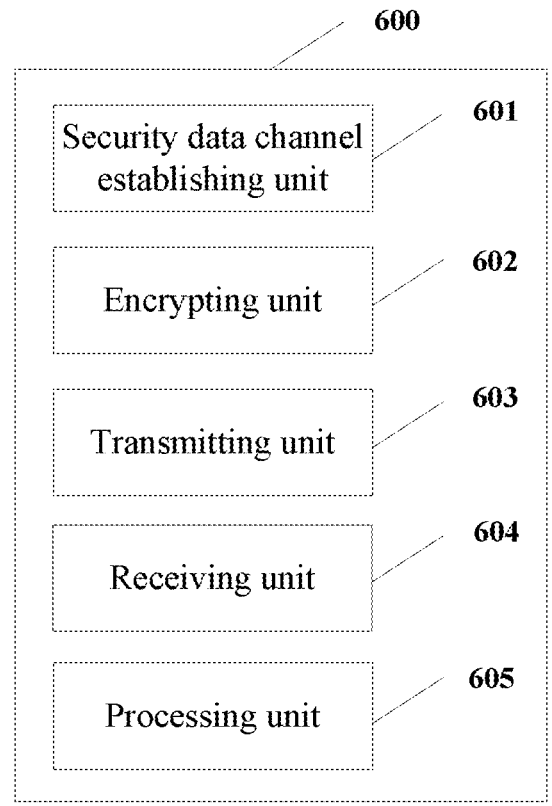
FIG. 6 is a schematic block diagram of a digital certificate requesting device according to an embodiment of the present disclosure.

Reference is made to FIG. 6, which is a schematic block diagram of a digital certificate requesting device according to an embodiment of the present disclosure.

A digital certificate requesting device 600 is provided, which includes a security data channel establishing unit 601, an encrypting unit 602, a transmitting unit 603, a receiving unit 604 and a processing unit 605. The security data channel establishing unit 601 is configured to negotiate with a digital certificate issuing device by using an acquired authorization code, to establish a security data channel and generate a security key. The security key includes a data communication key. The encrypting unit 602 is configured to encrypt a digital certificate management request message with the data communication key. The transmitting unit 603 is configured to transmit the digital certificate management request message to the digital certificate issuing device through the security data channel. The digital certificate management request message is encrypted with the data communication key. The receiving unit 604 is configured receive a digital certificate management response message from the digital certificate issuing device through the security data channel. The digital certificate management response message is encrypted with the data communication key. The processing unit 605 is configured to process the digital certificate management response message, to obtain a processing result.

In some embodiments, the processing unit 605 is further configured to generate a digital certificate management confirmation message. The transmitting unit 603 is further configured to transmit the digital certificate management confirmation message to the digital certificate issuing device through the security data channel. The digital certificate management confirmation message is encrypted with the data communication key.

In some embodiments, certificate request data carried in the digital certificate management request message transmitted from the transmitting unit 603 includes certificate request information, a signature algorithm identifier and a signature value. The certificate request information includes information of a version, a name of a holder, a public key of the holder and an extension. The encrypting unit 602 is further configured to encrypt the digital certificate management request message with the data communication key in the security data channel.

In some embodiments, the encrypting unit 602 is further configured to encrypt, in a case that the security key further includes a data session key, the certificate request data carried in the digital certificate management request message with the data session key before the digital certificate management request message is encrypted with the data communication key in the security data channel.

The certificate request information further includes information of a serial number, a name of an issuer and a valid period.

Further, in a case that the digital certificate requesting device supports two or more encryption algorithms, an encryption algorithm identifier is included in the certificate request data transmitted from the transmitting unit 603. Specifically, the certificate request data transmitted from the transmitting unit 603 includes the encryption algorithm identifier and data obtained by encrypting the certificate request information, the signature algorithm identifier and the signature value with the data session key by using an encryption algorithm corresponding to the encryption algorithm identifier. The encrypting unit 602 is further configured to encrypt the certificate request information, the signature algorithm identifier and the signature value with the data session key by using the encryption algorithm corresponding to the encryption algorithm identifier.

In some embodiments, the transmitting unit 603 includes at least one of a first transmitting unit, a second transmitting unit, a third transmitting unit and a fourth transmitting unit. The first transmitting unit is configured to transmit digital certificate request information to the digital certificate issuing device through a security data channel, to request for a new digital certificate. The digital certificate request information includes a certificate generating manner and the certificate request data. The second transmitting unit is configured to transmit digital certificate acquisition information to the digital certificate issuing device through the security data channel, to query or update an existing digital certificate. The digital certificate acquisition information includes fields of a name of an issuing device and a serial number. The third transmitting unit is configured to transmit digital certificate revocation information to the digital certificate issuing device through the security data channel, to request for revoking an existing digital certificate. The digital certificate revocation information includes fields of a name of an issuing device, a serial number and a reason for revoking. The fourth transmitting unit is configured to transmit digital certificate revocation list information to the digital certificate issuing device through the security data channel, to request for a digital certificate revocation list. The digital certificate revocation list information includes a field of a name of an issuing device.

In some embodiments, the security data channel establishing unit 601 includes a negotiating unit, a key generating unit and a key verifying unit. The negotiating unit is configured to negotiate with the digital certificate issuing device to establish the security data channel. The key generating unit is configured to generate, with the digital certificate issuing device, the security key in the security data channel by using the random number and identity information that are acquired during the negotiation and an authorization code. The key verifying unit is configured to verify, with the digital certificate issuing device, a security channel confirmation message by using an integrity verify code.

In some embodiments, the negotiating unit is further configured to transmit a first random number and first identity information to the digital certificate issuing device and receive a second random number and second identity information from the digital certificate issuing device. The key generating unit is further configured to generate, with the digital certificate issuing device, the security key by using the authorization code, the first random number, the first identity information, the second random number and the second identity information.

In some embodiments, the security key generated by the key generating unit further includes an integrity verify key. The key verifying unit is further configured to generate, with the digital certificate issuing device, an integrity verify code by using the random number and the integrity verify key, and verify the security channel confirmation message by using the integrity verify code.

Units or modules of the device according to the present disclosure may be configured according to the methods shown in FIGS. 2 to 5, which are not described in detail herein. It is to be noted that a device for managing a digital certificate may be an independent device, integrated with the digital certificate issuing device or as a part of the digital certificate issuing device, which is not limited herein.

Figure 7:
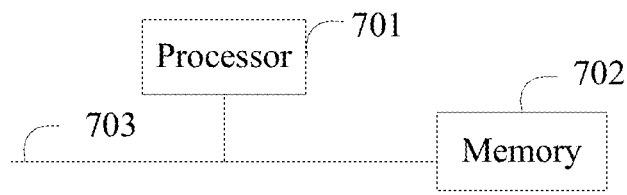
FIG. 7 is a schematic block diagram of a digital certificate requesting device according to another embodiment of the present disclosure.

Reference is made to FIG. 7, which is a schematic block diagram of a digital certificate requesting device according to another embodiment of the present disclosure. The digital certificate requesting device includes one or more processors 701 (for example, CPUs), a memory 702 and at least one communication bus 703. The communication bus 703 is configured to connect the one or more processors 701 and the memory 702. The one or more processors 701 are configured to execute an executable module, for example, a computer program, stored in the memory 702. The memory 702 may be a high-speed random access memory (RAM), and may also be a non-volatile memory, for example, at least one disk memory. One or more programs are stored in the memory. The one or more processors 701 are configured to execute instructions stored in the one or more programs, to perform the steps of: negotiating with a digital certificate issuing device by using an acquired authorization code, to establish a security data channel and generate a security key, where the security key includes a data communication key; encrypting a digital certificate management request message with the data communication key; transmitting the digital certificate management request message to the digital certificate issuing device through the security data channel, where the digital certificate management request message is encrypted with the data communication key; receiving a digital certificate management response message from the digital certificate issuing device through the security data channel, where the digital certificate management response message is encrypted with the data communication key; and processing the digital certificate management response message to obtain a processing result.

In some embodiments, the one or more processors 701 are further configured to execute instructions stored in the one or more programs, to perform the steps of: transmitting a digital certificate management confirmation message to the digital certificate issuing device through the security data channel. The digital certificate management confirmation message is encrypted with the data communication key.

In some embodiments, the one or more processors 701 are further configured to execute instructions stored in the one or more programs, to perform the steps of: transmitting digital certificate request information to the digital certificate issuing device through the security data channel, to request for a new digital certificate. The digital certificate request information includes a certificate generating manner and certificate request data.

In some embodiments, the one or more processors 701 are further configured to execute instructions stored in the one or more programs, to perform the steps of: transmitting digital certificate acquisition information to the digital certificate issuing device through the security data channel, to query or update an existing digital certificate. The digital certificate acquisition information includes fields of a name of an issuing device and a serial number.

In some embodiments, the one or more processors 701 are further configured to execute instructions stored in the one or more programs, to perform the steps of: transmitting digital certificate revocation information to the digital certificate issuing device through the security data channel, to request for revoking an existing digital certificate. The digital certificate revocation information includes fields of a name of an issuing device, a serial number and a reason for revoking.

In some embodiments, the one or more processors 701 are further configured to execute instructions stored in the one or more programs, to perform the steps of: transmitting digital certificate revocation list information to the digital certificate issuing device through the security data channel, to request for a digital certificate revocation list. The digital certificate revocation list information includes fields of a name of an issuing device.

In some embodiments, the one or more processors 701 are further configured to execute instructions stored in the one or more programs, to perform the steps of: negotiating with the digital certificate issuing device to establish the security data channel; generating, with the digital certificate issuing device, the security key in the security data channel by using the random number and identity information that are acquired during the negotiation and an authorization code; and verify, with the digital certificate issuing device, a security channel confirmation message by using an integrity verify code.

In some embodiments, the one or more processors 701 are further configured to execute instructions stored in the one or more programs, to perform the steps of: transmitting a first random number and first identity information to the digital certificate issuing device and receiving a second random number and second identity information from the digital certificate issuing device; and generating, with the digital certificate issuing device, the security key by using the authorization code, the first random number, the first identity information, the second random number and the second identity information.

In some embodiments, the one or more processors 701 are further configured to execute instructions stored in the one or more programs, to perform the steps of: generating, with the digital certificate issuing device, the integrity verify code by using the random number and the integrity verify key; and verifying the security channel confirmation message by using the integrity verify code.

Figure 8:
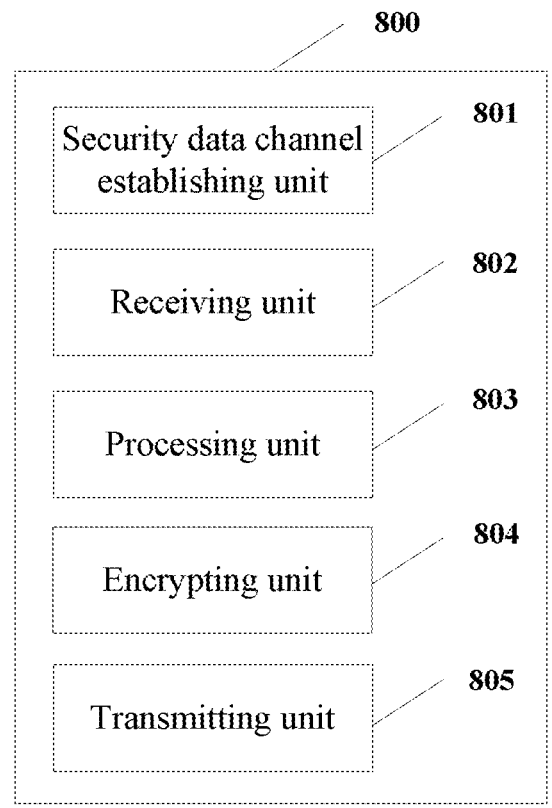
FIG. 8 is a schematic block diagram of a digital certificate issuing device according to an embodiment of the present disclosure.

Reference is made to FIG. 8, which is a schematic block diagram of a digital certificate issuing device according to an embodiment of the present disclosure.

A digital certificate issuing device 800 is provided, which includes a security data channel establishing unit 801, a receiving unit 802, a processing unit 803, an encrypting unit 804 and a transmitting unit 805. The security data channel establishing unit 801 is configured to negotiate with a digital certificate requesting device by using an authorization code, to establish a security data channel and generate a security key. The security key includes a data communication key. The receiving unit 802 is configured to receive a digital certificate management request message transmitted from the digital certificate requesting device through the security data channel. The digital certificate management request message is encrypted with the data communication key. The processing unit 803 is configured to process the received digital certificate management request message, and generate a digital certificate management response message. The encrypting unit 804 is configured to encrypt the digital certificate management response message with the data communication key. The transmitting unit 805 is configured to transmit the digital certificate management response message to the digital certificate requesting device through the security data channel. The digital certificate management response message is encrypted with the data communication key.

In some embodiments, the receiving unit 802 is further configured to receive a digital certificate management confirmation message transmitted from the digital certificate requesting device through the security data channel. The processing unit 803 is further configured to process the received digital certificate management confirmation message.

In some embodiments, the digital certificate management response message transmitted from the transmitting unit 805 carries certificate response data. The encrypting unit 804 is further configured to encrypt the digital certificate management response message with the data communication key in the security data channel. Certificate request data carried in the digital certificate management request message received by the receiving unit 802 includes certificate request information, a signature algorithm identifier and a signature value. The certificate request information includes information of a version, a name of a holder, a public key of the holder and an extension.

In some embodiments, the encrypting unit 804 is further configured to encrypt, in a case that the security key further includes a data session key, the certificate response data carried in the digital certificate management response message with the data session key before the digital certificate management response message is encrypted with the data communication key in the security data channel. The certificate request information further includes information of a serial number, a name of an issuer and a valid period.

In some embodiments, in a case that the digital certificate issuing device supports two or more encryption algorithms, an encryption algorithm identifier is included in the certificate response data transmitted from the transmitting unit 805. Specifically, the certificate response data transmitted from the transmitting unit 805 includes the encryption algorithm identifier and data obtained by encrypting the certificate response data with the data session key by using an encryption algorithm corresponding to the encryption algorithm identifier. The encrypting unit 804 is further configured to encrypt the certificate response data with the data session key by using the encryption algorithm corresponding to the encryption algorithm identifier.

In some embodiments, the security data channel establishing unit 801 includes a negotiating unit, a key generating unit and a key verifying unit. The negotiating unit is configured to negotiate with a digital certificate requesting device to establish a security data channel. The key generating unit is configured to generate, with the digital certificate requesting device, a security key in the security data channel by using the random number and identity information that are acquired during the negotiation and an authorization code. The key verifying unit is configured to verify, with the digital certificate requesting device, a security channel confirmation message by using an integrity verify code.

In some embodiments, the negotiating unit is further configured to transmit a second random number and second identity information to the digital certificate requesting device and receive a first random number and first identity information from the digital certificate requesting device. The key generating unit is further configured to generate a security key by using the authorization code, the first random number, the first identity information, the second random number and the second identity information.

In some embodiments, the security key generated by the key generating unit further includes an integrity verify key. The key verifying unit is further configured to generate, with the digital certificate requesting device, an integrity verify code by using the random number and the integrity verify key, and verify the security channel confirmation message by using the integrity verify code.

Figure 9:
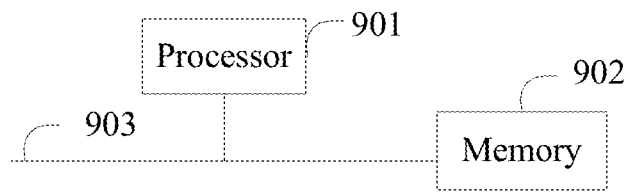
FIG. 9 is a schematic block diagram of a digital certificate issuing device according to another embodiment of the present disclosure.

Reference is made to FIG. 9, which is a schematic block diagram of a digital certificate issuing device according to another embodiment of the present disclosure. The digital certificate issuing device includes one or more processors 901 (for example, CPUs), a memory 902 and at least one communication bus 903. The communication bus 903 is configured to connect the one or more processors 901 and the memory 902. The one or more processors 901 are configured to execute an executable module, for example, a computer program, stored in the memory 902. The memory 902 may be a high-speed random access memory (RAM), and may also be a non-volatile memory, for example, at least one disk memory. One or more programs are stored in the memory. The one or more processors 901 are configured to execute instructions stored in the one or more programs, to perform the steps of: negotiating with a digital certificate requesting device by using an authorization code, to establish a security data channel and generate a security key, where the security key includes a data communication key; receiving a digital certificate management request message transmitted from the digital certificate requesting device through the security data channel, where the digital certificate management request message is encrypted with the data communication key; processing the received digital certificate management request message, and generating a digital certificate management response message; and transmitting the digital certificate management response message to the digital certificate requesting device through the security data channel, where the digital certificate management response message is encrypted with the data communication key.

In some embodiments, the one or more processors 901 are further configured to execute instructions stored in the one or more programs, to perform the steps of: receiving and processing a digital certificate management confirmation message generated by the digital certificate requesting device and transmitted through the security data channel.

In some embodiments, the one or more processors 901 are further configured to execute instructions stored in the one or more programs, to perform the steps of: negotiating with the digital certificate requesting device to establish a security data channel; generating, with the digital certificate requesting device, a security key in the security data channel by using the random number and identity information that are acquired during the negotiation and an authorization code; and verifying, with the digital certificate requesting device, a security channel confirmation message by using an integrity verify code.

In some embodiments, the one or more processors 901 are further configured to execute instructions stored in the one or more programs, to perform the steps of: transmitting a second random number and second identity information to the digital certificate requesting device and receiving a first random number and first identity information from the digital certificate requesting device.

In some embodiments, the one or more processors 901 are further configured to execute instructions stored in the one or more programs, to perform the steps of: generating the security key by using the authorization code, the first random number, the first identity information, the second random number and the second identity information.

It is to be noted by those skilled in the art that there is a correspondence between the above described method and devices.

Other embodiments of the present disclosure may be obtained by those skilled in the art after performing the embodiments of the present disclosure in consideration of the specification. The present disclosure is intended to cover any variations, uses or adaptations of the embodiments. These variations, uses or adaptations follow the general principle of the present disclosure and include common knowledge and conventional technical means in the technical field which are not disclosed in the present disclosure. The specification and embodiments are exemplary only, and the scope and spirit of the present disclosure are indicated by the claims.

It should be noted that the present disclosure is not limited to the details described above and shown in the drawings. Various modifications and changes may be made without departing from the scope of the present disclosure. The scope of the present disclosure is limited only by the claims.

The embodiments described above are only preferred embodiments of the present disclosure, and are not used to limit the present disclosure. Any modifications, equivalents and improvements made within the scope and spirit of the present disclosure should fall within the protection scope of the present disclosure.

It should be further noted that the relationship terminologies such as "first", "second" and the like are only used herein to distinguish one entity or operation from another, rather than necessitating or implying that the actual relationship or order exists between the entities or operations. Furthermore, terms of "include", "comprise" or any other variants are intended to be non-exclusive. Therefore, a process, method, article or device including a plurality of elements includes not only the elements but also other elements that are not enumerated, or also include the elements inherent for the process, method, article or device. Unless expressively limited otherwise, the statement "comprising (including) one . . . " does not exclude the case that other similar elements may exist in the process, method, article or device. The present disclosure may be described in the general context of computer-executable instructions executed by a computer, such as a program module. Generally, the program module includes routines, programs, objects, components, data structures, and the like that are used to perform particular tasks or implement particular abstract data types. The present disclosure may also be implemented in a distributed computing environment where tasks are performed by remote processing devices connected via a communication network. In the distributed computing environment, the program module may be located in local and remote computer storage media including storage devices.

The embodiments in the specification are described in a progressive manner, Each of the embodiments is mainly focused on describing its differences from other embodiments, and references may be made among these embodiments with respect to the same or similar portions among these embodiments. Particularly, since embodiments of the devices are substantially similar to the embodiments of the method, the embodiments of the devices are described briefly, and for relevant parts, reference may be made to the description of the method. The embodiments of the devices described above are only schematic, units described as separate components may be or be not physically separated. Components shown as units may be or may be not physical units, i.e., may be located in one place or may be distributed to multiple network units. As needed, some or all of the modules may be selected to implement the embodiments of the present disclosure. Those skilled in the art may implement the embodiments of the present disclosure without any creative work. Only specific embodiments of the present disclosure are described above, it should be pointed out that various improvements and modifications can be made by those skilled in the art without departing from the principle of the present disclosure, and these improvements and modifications should fall within the protection scope of the present disclosure.

The invention claimed is:

1. A method for managing a digital certificate, comprising:
   negotiating, by a digital certificate requesting device, with a digital certificate issuing device by using an acquired authorization code, to establish a security data channel and generate a security key, wherein the security key comprises at least a data communication key;
   transmitting, by the digital certificate requesting device, a digital certificate management request message to the digital certificate issuing device through the security data channel, wherein the digital certificate management request message is encrypted with the data communication key;
   receiving the digital certificate management request message by the digital certificate issuing device, and transmitting, by the digital certificate issuing device, a digital certificate management response message to the digital certificate requesting device through the security data channel, wherein the digital certificate management response message is encrypted with the data communication key;
   receiving the digital certificate management response message by the digital certificate requesting device through the security data channel; and
   processing the digital certificate management response message by the digital certificate requesting device, to obtain a processing result,
   wherein the digital certificate management request message carries certificate request data, the digital certificate management response message carries certificate response data, the certificate request data comprises certificate request information, a signature algorithm identifier and a signature value, the certificate request information comprises information of a version, a name of a holder, a public key of the holder and an extension, the digital certificate management request message is encrypted with the data communication key in a way that the digital certificate management request message is encrypted with the data communication key in the security data channel, and
   the digital certificate management response message is encrypted with the data communication key in a way that the digital certificate management response message is encrypted with the data communication key in the security data channel.

2. The method according to claim 1, further comprising:
   transmitting, by the digital certificate requesting device, a digital certificate management confirmation message to the digital certificate issuing device through the security data channel, wherein the digital certificate management confirmation message is encrypted with the data communication key; and
   receiving and processing the digital certificate management confirmation message by the digital certificate issuing device.

3. The method according to claim 1, wherein the security key further comprises a data session key,
   the digital certificate management request message is encrypted with the data communication key in a further way that the certificate request data carried in the digital certificate management request message is encrypted with the data session key before the digital certificate management request message is encrypted with the data communication key in the security data channel, and wherein
   the certificate request information further comprises information of a serial number, a name of an issuer and a valid period.

4. The method according to claim 3, wherein in a case that two or more encryption algorithms are supported by the digital certificate requesting device and/or the digital certificate issuing device, an encryption algorithm identifier is comprised in the certificate request data, and wherein
   the certificate request data further comprises the encryption algorithm identifier and data obtained by encrypting the certificate request information, the signature algorithm identifier and the signature value with the data session key by using an encryption algorithm corresponding to the encryption algorithm identifier.

5. The method according to claim 4, wherein the digital certificate management response message is encrypted with the data communication key in a further way that the certificate response data carried in the digital certificate management response message is encrypted with the data session key before the digital certificate management response message is encrypted with the data communication key in the security data channel.

6. The method according to claim 3, wherein the digital certificate management response message is encrypted with the data communication key in a further way that the certificate response data carried in the digital certificate management response message is encrypted with the data session key before the digital certificate management response message is encrypted with the data communication key in the security data channel.

7. The method according to claim 6, wherein in a case that two or more encryption algorithms are supported by the digital certificate requesting device and/or the digital certificate issuing device, an encryption algorithm identifier is comprised in the certificate response data, and wherein
   the certificate response data comprises the encryption algorithm identifier and data obtained by encrypting the certificate response data with the data session key by using an encryption algorithm corresponding to the encryption algorithm identifier.

8. The method according to claim 1, wherein the transmitting, by the digital certificate requesting device, the digital certificate management request message to the digital certificate issuing device through the security data channel comprises:

transmitting, by the digital certificate requesting device, digital certificate request information to the digital certificate issuing device through the security data channel, to request for a new digital certificate, wherein the digital certificate request information comprises fields of a certificate generating manner and certificate request data; and/or transmitting, by the digital certificate requesting device, digital certificate acquisition information to the digital certificate issuing device through the security data channel, to query or update an existing digital certificate, wherein the digital certificate acquisition information comprises fields of a name of an issuing device and a serial number; and/or transmitting, by the digital certificate requesting device, digital certificate revocation information to the digital certificate issuing device through the security data channel, to request for revoking an existing digital certificate, wherein the digital certificate revocation information comprises fields of a name of an issuing device, a serial number and a reason for revocation; and/or transmitting, by the digital certificate requesting device, digital certificate revocation list information to the digital certificate issuing device through the security data channel, to request for a digital certificate revocation list, wherein the digital certificate revocation list information comprises a field of a name of an issuing device.

9. The method according to claim 1, wherein the negotiating, by the digital certificate requesting device, with the digital certificate issuing device by using the acquired authorization code, to establish the security data channel and generate the security key comprises:

negotiating by the digital certificate requesting device with the digital certificate issuing device to establish the security data channel;

generating, by the digital certificate requesting device with the digital certificate issuing device, the security key in the security data channel by using a random number and identity information that are acquired during the negotiation and the authorization code; and verifying, by the digital certificate requesting device with the digital certificate issuing device, a security channel confirmation message by using an integrity verify code.

10. The method according to claim 9, wherein
the negotiating by the digital certificate requesting device with the digital certificate issuing device to establish the security data channel comprises:

transmitting, by the digital certificate requesting device, a first random number and first identity information to the digital certificate issuing device, and receiving, by the digital certificate requesting device, a second random number and second identity information from the digital certificate issuing device, and the generating, by the digital certificate requesting device with the digital certificate issuing device, the security key in the security data channel by using the random number and the identity information that are acquired during the negotiation and the authorization code comprises:

generating, by the digital certificate requesting device with the digital certificate issuing device, the security key by using the authorization code, the first random number, the first identity information, the second random number and the second identity information.

11. The method according to claim 10, wherein the security key further comprises an integrity verify key, and
the verifying, by the digital certificate requesting device with the digital certificate issuing device, the security channel confirmation message by using the integrity verify code comprises:

generating, by the digital certificate requesting device with the digital certificate issuing device, the integrity verify code by using the random number and the integrity verify key; and verifying, by the digital certificate requesting device with the digital certificate issuing device, the security channel confirmation message by using the integrity verify code.

12. The method according to claim 9, wherein the security key further comprises an integrity verify key, and
the verifying, by the digital certificate requesting device with the digital certificate issuing device, the security channel confirmation message by using the integrity verify code comprises:

generating, by the digital certificate requesting device with the digital certificate issuing device, the integrity verify code by using the random number and the integrity verify key; and verifying, by the digital certificate requesting device with the digital certificate issuing device, the security channel confirmation message by using the integrity verify code.

13. A digital certificate requesting device, comprising:
a processor, configured to perform computer instructions; and
a memory storing the computer instructions, the computer instructions comprising:
a security data channel establishing instruction configured to negotiate with a digital certificate issuing device by using an acquired authorization code, to establish a security data channel and generate a security key, wherein the security key comprises a data communication key;
an encrypting instruction configured to encrypt a digital certificate management request message with the data communication key;
a transmitting instruction configured to transmit the digital certificate management request message to the digital certificate issuing device through the security data channel, wherein the digital certificate management request message is encrypted with the data communication key;
a receiving instruction configured to receive a digital certificate management response message from the digital certificate issuing device through the security data channel, wherein the digital certificate management response message is encrypted with the data communication key; and
a processing instruction configured to process the digital certificate management response message, to obtain a processing result, wherein
the digital certificate management request message transmitted through the transmitting instruction carries certificate request data, wherein the certificate request data comprises certificate request information, a signature algorithm identifier and a signature value, and the certificate request information comprises information of a version, a name of a holder, a public key of the holder and an extension, and
the encrypting instruction is configured to encrypt the digital certificate management request message with the data communication key in the security data channel.

14. The device according to claim 13, wherein
the processing instruction is further configured to generate a digital certificate management confirmation message, and
the transmitting instruction is further configured to transmit the digital certificate management confirmation message to the digital certificate issuing device through the security data channel, wherein the digital certificate management confirmation message is encrypted with the data communication key.

15. The device according to claim 13, wherein
the encrypting instruction is further configured to encrypt, in a case that the security key further comprises a data session key, the certificate request data carried in the digital certificate management request message with the data session key before the digital certificate management request message is encrypted with the data communication key in the security data channel, and wherein
the certificate request information further comprises information of a serial number, a name of an issuer and a valid period.

16. The device according to claim 15, wherein in a case that the digital certificate requesting device supports two or more encryption algorithms, an encryption algorithm identifier is comprised in the certificate request data transmitted through the transmitting instruction, and wherein
the certificate request data transmitted through the transmitting instruction further comprises the encryption algorithm identifier and data obtained by encrypting the certificate request information, the signature algorithm identifier and the signature value with the data session key by using an encryption algorithm corresponding to the encryption algorithm identifier, and
the encrypting instruction is further configured to encrypt the certificate request information, the signature algorithm identifier and the signature value with the data session key by using the encryption algorithm corresponding to the encryption algorithm identifier.

17. The device according to claim 13, wherein the transmitting instruction comprises:
a first transmitting instruction configured to transmit digital certificate request information to the digital certificate issuing device through the security data channel, to request for a new digital certificate, wherein the digital certificate request information comprises fields of a certificate generating manner and certificate request data; and/or
a second transmitting instruction configured to transmit digital certificate acquisition information to the digital certificate issuing device through the security data channel, to query or update an existing digital certificate, wherein the digital certificate acquisition information comprises fields of a name of an issuing device and a serial number; and/or
a third transmitting instruction configured to transmit digital certificate revocation information to the digital certificate issuing device through the security data channel, to request for revoking an existing digital certificate, wherein the digital certificate revocation information comprises fields of a name of an issuing device, a serial number and a reason for revocation; and/or
a fourth transmitting instruction configured to transmit digital certificate revocation list information to the digital certificate issuing device through the security data channel, to request for a digital certificate revocation list, wherein the digital certificate revocation list information comprises a field of a name of an issuing device.

18. The device according to claim 13, wherein the security data channel establishing instruction comprises:
a negotiating instruction configured to negotiate with the digital certificate issuing device to establish the security data channel;
a key generating instruction configured to generate, with the digital certificate issuing device, the security key in the security data channel by using a random number and identity information that are acquired during the negotiation and the authorization code; and
a key verifying instruction configured to verify, with the digital certificate issuing device, a security channel confirmation message by using an integrity verify code.

19. The device according to claim 18, wherein
the negotiating instruction is further configured to transmit a first random number and first identity information to the digital certificate issuing device and receive a second random number and second identity information from the digital certificate issuing device, and
the key generating instruction is further configured to generate, with the digital certificate issuing device, the security key by using the authorization code, the first random number, the first identity information, the second random number and the second identity information.

20. The device according to claim 19, wherein the security key generated by the key generating instruction further comprises an integrity verify key, and
the key verifying instruction is further configured to generate, with the digital certificate issuing device, an integrity verify code by using the random number and the integrity verify key, and verify, with the digital certificate issuing device, the security channel confirmation message by using the integrity verify code.

21. The device according to claim 18, wherein the security key generated by the key generating instruction further comprises an integrity verify key, and
the key verifying instruction is further configured to generate, with the digital certificate issuing device, an integrity verify code by using the random number and the integrity verify key, and verify, with the digital certificate issuing device, the security channel confirmation message by using the integrity verify code.

22. A digital certificate requesting device, comprising:
a memory; and
one or more programs stored in the memory, wherein the one or more programs comprises instructions which, when executed by one or more processors, cause the one or more processors to perform steps of:

negotiating with a digital certificate issuing device by using an acquired authorization code, to establish a security data channel and generate a security key, wherein the security key comprises at least a data communication key;

encrypting a digital certificate management request message with the data communication key;

transmitting the digital certificate management request message to the digital certificate issuing device through the security data channel, wherein the digital certificate management request message is encrypted with the data communication key;

receiving a digital certificate management response message from the digital certificate issuing device through the security data channel, wherein the digital certificate management response message is encrypted with the data communication key; and processing the digital certificate management response message to obtain a processing result, wherein the digital certificate management request message transmitted through the transmitting instruction carries certificate request data, wherein the certificate request data comprises certificate request information, a signature algorithm identifier and a signature value, and the certificate request information comprises information of a version, a name of a holder, a public key of the holder and an extension, and the encrypting instruction is configured to encrypt the digital certificate management request message with the data communication key in the security data channel.

23. A digital certificate issuing device, comprising:

a processor, configured to perform computer instructions; and a memory storing the computer instructions, the computer instructions comprising:

a security data channel establishing instruction configured to negotiate with a digital certificate requesting device by using an authorization code, to establish a security data channel and generate a security key, wherein the security key comprises at least a data communication key;

a receiving instruction configured to receive a digital certificate management request message transmitted from the digital certificate requesting device through the security data channel, wherein the digital certificate management request message is encrypted with the data communication key;

a processing instruction configured to process the received digital certificate management request message and generate a digital certificate management response message;

an encrypting instruction configured to encrypt the digital certificate management response message with the data communication key; and a transmitting instruction configured to transmit the digital certificate management response message to the digital certificate requesting device through the security data channel, wherein the digital certificate management response message is encrypted with the data communication key, wherein the digital certificate management response message transmitted through the transmitting instruction carries certificate response data, and the encrypting instruction is further configured to encrypt the digital certificate management response message with the data communication key in the security data channel, and wherein the certificate request data carried in the digital certificate management request message received by the receiving instruction comprises certificate request information, a signature algorithm identifier and a signature value, and the certificate request information comprises information of a version, a name of a holder, a public key of the holder and an extension.

24. The device according to claim 23, wherein the receiving instruction is further configured to receive a digital certificate management confirmation message transmitted from the digital certificate requesting device through the security data channel, wherein the digital certificate management confirmation message is encrypted with the data communication key, and the processing instruction is further configured to process the received digital certificate management confirmation message.

25. The device according to claim 23, wherein the encrypting instruction is further configured to encrypt, in a case that the security key further comprises a data session key, the certificate response data carried in the digital certificate management response message with the data session key before the digital certificate management response message is encrypted with the data communication key in the security data channel, and wherein the certificate request information further comprises information of a serial number, a name of an issuer and a valid period.

26. The device according to claim 25, wherein in a case that the digital certificate issuing device supports two or more encryption algorithms, an encryption algorithm identifier is comprised in the certificate response data transmitted through the transmitting instruction, and the certificate response data comprises the encryption algorithm identifier and data obtained by encrypting the certificate response data with the data session key by using an encryption algorithm corresponding to the encryption algorithm identifier, and wherein the encrypting instruction is further configured to encrypt the certificate response data with the data session key by using the encryption algorithm corresponding to the encryption algorithm identifier.

27. The device according to claim 23, wherein the security data channel establishing instruction comprises:

a negotiating instruction configured to negotiate with the digital certificate requesting device to establish the security data channel; and a key generating instruction configured to generate, with the digital certificate requesting device, the security key in the security data channel by using a random number and identity information that are acquired during the negotiation and the authorization code; and a key verifying instruction configured to verify, with the digital certificate requesting device, a security channel confirmation message by using an integrity verify code.

28. The device according to claim 27, wherein the negotiating instruction is further configured to transmit a second random number and second identity information to the digital certificate requesting device and receive a first random number and first identity information from the digital certificate requesting device, and the key generating instruction is further configured to generate the security key by using the authorization code, the first random number, the first identity information, the second random number and the second identity information.

29. The device according to claim 28, wherein the security key generated by the key generating instruction further comprises an integrity verify key, and
the key verifying instruction is further configured to generate, with the digital certificate requesting device, the integrity verify code by using the random number and the integrity verify key, and verify the security channel confirmation message by using the integrity verify code.

30. The device according to claim 27, wherein the security key generated by the key generating instruction further comprises an integrity verify key, and
the key verifying instruction is further configured to generate, with the digital certificate requesting device, the integrity verify code by using the random number and the integrity verify key, and verify the security channel confirmation message by using the integrity verify code.

31. A digital certificate issuing device, comprising:
a memory; and
one or more programs stored in the memory, wherein the one or more programs comprises instructions which, when executed by one or more processors, cause the one or more processors to perform steps of:
negotiating with a digital certificate requesting device by using an authorization code, to establish a security data channel and generate a security key, wherein the security key comprises a data communication key;
receiving a digital certificate management request message transmitted from the digital certificate requesting device through the security data channel, wherein the digital certificate management request message is encrypted with the data communication key;
processing the received digital certificate management request message and generating a digital certificate management response message;
encrypting the digital certificate management response message with the data communication key; and
transmitting the digital certificate management response message to the digital certificate requesting device through the security data channel, wherein the digital certificate management response message is encrypted with the data communication key,
wherein
the digital certificate management response message transmitted through the transmitting instruction carries certificate response data, and
the encrypting instruction is further configured to encrypt the digital certificate management response message with the data communication key in the security data channel, and wherein
the certificate request data carried in the digital certificate management request message received by the receiving instruction comprises certificate request information, a signature algorithm identifier and a signature value, and the certificate request information comprises information of a version, a name of a holder, a public key of the holder and an extension.

* * * * *